United States Patent
Takeda et al.

(10) Patent No.: US 11,201,714 B2
(45) Date of Patent: Dec. 14, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Yuichi Kakishima, Palo Alto, CA (US); Huiling Li, Beijing (CN); Chongning Na, Beijing (CN); Lihui Wang, Beijing (CN); Xin Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/650,929

(22) PCT Filed: Sep. 29, 2017

(86) PCT No.: PCT/JP2017/035680
§ 371 (c)(1),
(2) Date: Mar. 26, 2020

(87) PCT Pub. No.: WO2019/064561
PCT Pub. Date: Apr. 4, 2019

(65) Prior Publication Data
US 2020/0295905 A1    Sep. 17, 2020

(51) Int. Cl.
*H04L 5/00* (2006.01)

(52) U.S. Cl.
CPC .......... *H04L 5/0057* (2013.01); *H04L 5/0007* (2013.01)

(58) Field of Classification Search
CPC .................. H04B 7/0632; H04W 72/0413
See application file for complete search history.

(56) References Cited

U.S. PATENT DOCUMENTS

| 2014/0206375 A1 | 7/2014 | Ohta et al. |
| 2015/0009928 A1 | 1/2015 | Sohn et al. |

(Continued)

FOREIGN PATENT DOCUMENTS

| EP | 3223554 A1 | 9/2017 |
| JP | 2014-033314 A | 2/2014 |

(Continued)

OTHER PUBLICATIONS

International Search Report issued in Application No. PCT/JP2017/035680, dated Dec. 19, 2017 (5 pages).

(Continued)

*Primary Examiner* — Kevin Kim
(74) *Attorney, Agent, or Firm* — Osha Bergman Watanabe & Burton LLP

(57) ABSTRACT

To appropriately control UL transmission such as a CSI reporting when communication is performed by applying a different configuration from those of legacy LTE systems, one aspect of a user terminal according to the present invention includes: a transmitting section that transmits first Channel State Information (CSI) and second CSI of different information types to be reported, by using an uplink control channel and/or an uplink shared channel based on timings respectively configured by a base station; and a control section that, when transmission timings of the first CSI and the second CSI overlap, performs control to transmit both or one of the first CSI and the second CSI.

5 Claims, 15 Drawing Sheets

(56) References Cited

U.S. PATENT DOCUMENTS

2015/0195830 A1     7/2015   Takeda et al.
2018/0279293 A1*   9/2018   Harrison .............. H04B 7/0417

FOREIGN PATENT DOCUMENTS

JP       2015-512217 A     4/2015
WO     2013/046468 A1    4/2013

OTHER PUBLICATIONS

Written Opinion issued in Application No. PCT/JP2017/035680, dated Dec. 19, 2017 (5 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting NR#3; R1-1715466; "Details of CSI reporting on PUCCH/PUSCH;" Huawei, HiSilicon; Sep. 18-21, 2017; Nagoya, Japan (9 pages).
Extended European Search Report issued in counterpart European Patent Application No. 17927466.7, dated Apr. 9, 2021 (10 pages).
Huawei, HiSilicon; "Periodic CSI Feedback with HARQ-ACK for eCA"; 3GPP TSG RAN WG1 Meeting #83, R1-156456; Anaheim, USA; Nov. 15-22, 2015 (4 pages).

* cited by examiner

| | PERIODIC CSI (P-CSI) | SEMI-PERSISTENT CSI (SP-CSI) | APERIODIC CSI (A-CSI) |
|---|---|---|---|
| FREQUENCY GRANULARITY | WIDEBAND, PARTIAL BAND | WIDEBAND, PARTIAL BAND, SUBBAND | WIDEBAND, PARTIAL BAND, SUBBAND |
| PHYSICAL CHANNEL | SHORT PUCCH, LONG PUCCH | LONG PUCCH, PUSCH | PUSCH, SHORT PUCCH |
| CODEBOOK | TYPE 1-CSI | TYPE 1-CSI PARTIAL TYPE 2-CSI | TYPE 1-CSI TYPE 2-CSI |

FIG. 1

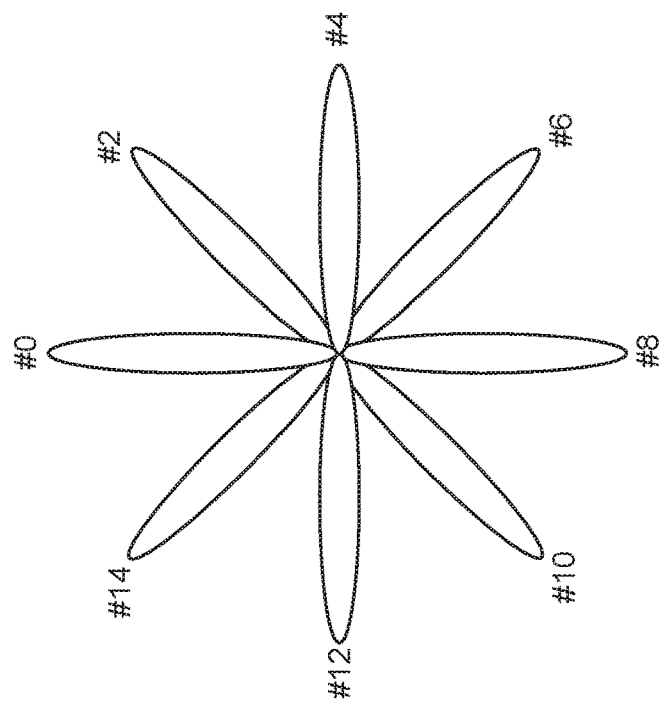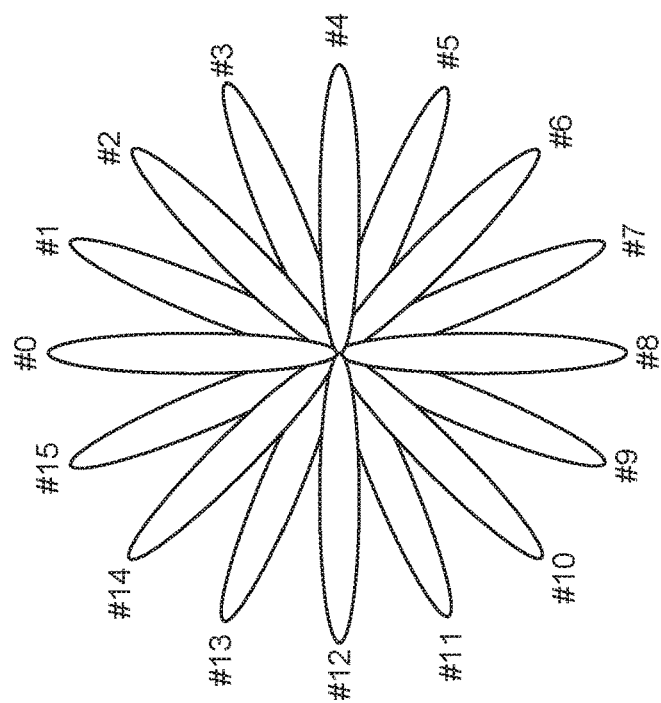
FIG. 7

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE (also referred to as LTE Rel. 8 or 9), LTE-Advanced (also referred to as LTE-A or LTE Rel. 10, 11 or 12) has been specified. LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) have been also studied.

In legacy LTE systems (e.g., LTE Rel. 8 to 13), a UE maps an uplink signal on an appropriate radio resource to transmit to an eNB. Uplink user data is transmitted by using an uplink shared channel (PUSCH: Physical Uplink Shared Channel). Furthermore, Uplink Control Information (UCI) is transmitted by using the PUSCH when transmitted together with the uplink user data, and is transmitted by using an uplink control channel (PUCCH: Physical Uplink Control Channel) when transmitted alone.

UCI includes transmission acknowledgement information (ACK/NACK) for a downlink shared channel (PDSCH: Physical Downlink Shared Channel), a scheduling request, and Channel State Information (CSI). The transmission acknowledgement information may be referred to as Hybrid Automatic Repeat reQuest Acknowledgement (HARQ-ACK), ACK/NACK (A/N) or retransmission control information.

CSI is information based on an instantaneous channel state of downlink, and is, for example, a Channel Quality Indicator (CQI), a Precoding Matrix Indicator (PMI), a Precoding Type Indicator (PTI) or a Rank Indicator (RI). The CSI is periodically or aperiodically notified from the UE to the eNB.

According to Periodic CSI (P-CSI), a UE periodically transmits CSI based on a periodicity or a resource notified from a radio base station. On the other hand, according to Aperiodic CSI (A-CSI), the UE transmits CSI in response to a CSI reporting request (also referred to as a trigger, a CSI trigger or a CSI request) from the radio base station.

The CSI trigger is included in an uplink scheduling grant (also referred to as an Uplink (UL) grant below) to be transmitted on a downlink control channel (PDCCH: Physical Downlink Control Channel). The UE notifies A-CSI by using a PUSCH indicated by the UL grant according to the CSI trigger included in the UL grant. This notification will be also referred to as an A-CSI reporting.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been also studied for future radio communication systems (e.g., LTE Rel. 14, 15 and subsequent releases, 5G and NR) to control a CSI reporting by a different configuration from those of legacy LTE systems (e.g., LTE Rel. 13 or prior releases).

For example, it is assumed to configure pluralities of items of contents to be reported by the CSI reporting, and timings (or periodicities) of the CSI reporting, and make the CSI reporting from a UE to a base station. Thus, when the CSI reporting is made by applying the different configuration from those of the legacy LTE systems, it is difficult to apply a CSI reporting control method of the legacy LTE systems as is.

The present invention has been made in light of this point, and one of objects of the present invention is to provide a user terminal and a radio communication method that can appropriately control UL transmission such as a CSI reporting when communication is performed by applying a different configuration from those of legacy LTE systems.

Solution to Problem

A user terminal according to one aspect of the present invention includes: a transmitting section that transmits first Channel State Information (CSI) and second CSI of different information types to be reported, by using an uplink control channel and/or an uplink shared channel based on timings respectively configured by a base station; and a control section that, when transmission timings of the first CSI and the second CSI overlap, performs control to transmit both or one of the first CSI and the second CSI.

Advantageous Effects of Invention

According to the present invention, it is possible to appropriately control UL transmission such as a CSI reporting when communication is performed by applying a different configuration from those of legacy LTE systems.

BRIEF DESCRIPTION OF DRAWINGS

FIG. 1 is a diagram for explaining a CSI reporting that is assumed by a future radio communication system.

FIG. 7 is a diagram illustrating one example of codebook sub sampling.

DESCRIPTION OF EMBODIMENTS

Figure 2:
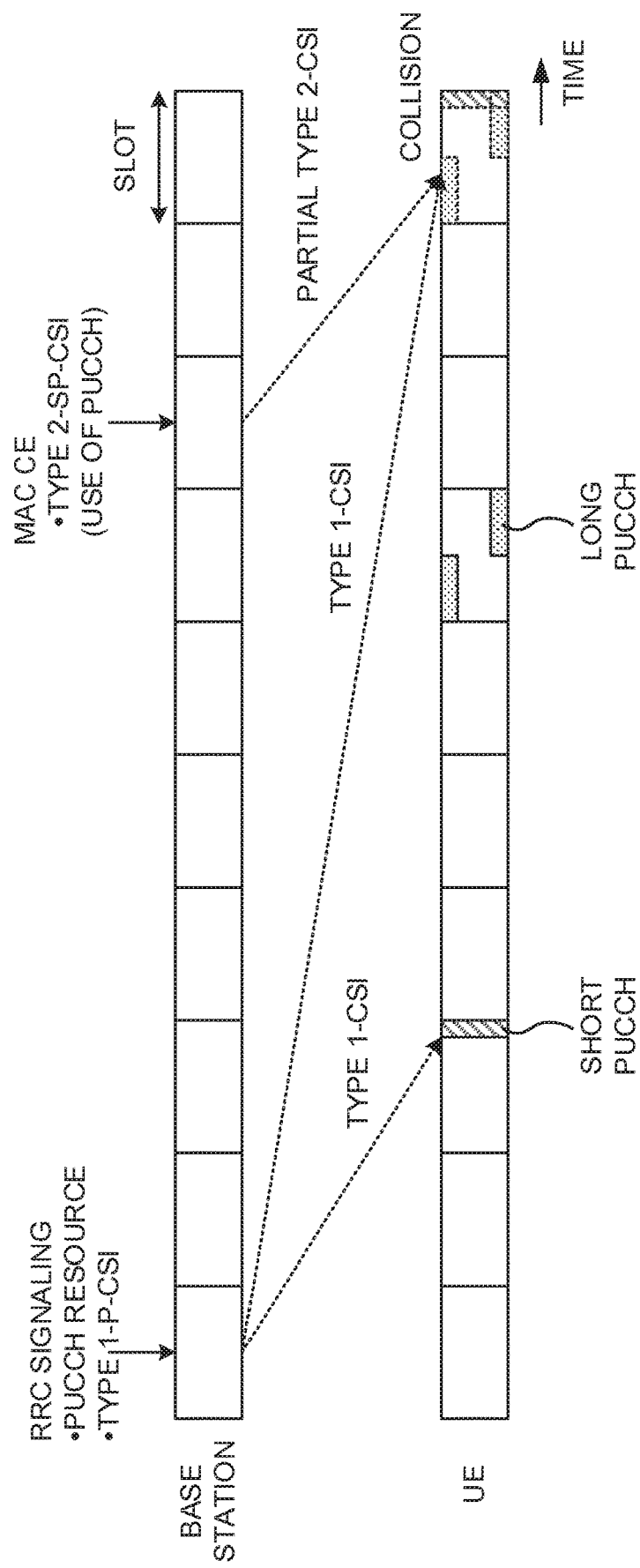
FIG. 2 is a diagram illustrating one example of a case where transmission timings of multiple CSI collide.

A reference signal for measuring a channel state on downlink is specified for legacy LTE systems (Rel. 10 to 13). The reference signal for channel state measurement will be also referred to as a Cell-specific Reference Signal (CRS) or a Channel State Information-Reference Signal (CSI-RS), and is a reference signal that is used to measure CSI such as a Channel Quality Indicator (CQI) that is a channel state, a Precoding Matrix Indicator (PMI) or a Rank Indicator (RI).

A user terminal (UE) feeds back a result measured based on the reference signal for channel state measurement as Channel State Information (CSI) to a radio base station at a given timing. As a CSI feedback method, a Periodic CSI reporting (P-CSI) and an Aperiodic CSI reporting (A-CSI) are specified.

When making the periodic CSI reporting, the UE feeds back the P-CSI per given periodicity (e.g., a 5-subframe periodicity or a 10-subframe periodicity). Furthermore, when uplink data (e.g., PUSCH) is not transmitted at a given timing (given subframe) for reporting the P-CSI, the UE transmits the P-CSI by using an uplink control channel (e.g., PUCCH).

Furthermore, when CA is applied, the UE transmits the P-CSI by using an uplink control channel of a given cell (e.g., a PCell, a PUCCH cell or a PSCell). On the other hand, when the uplink data is transmitted at the given timing, the UE can transmit the P-CSI by using the uplink shared channel.

When making an aperiodic CSI reporting, the UE transmits A-CSI in response to a CSI trigger (CSI request) from a radio base station. For example, the UE makes the A-CSI reporting after a given timing (e.g., 4 subframes) after receiving the CSI trigger.

The CSI trigger notified from the radio base station is included in downlink control information (e.g., DCI format 0/4) for an uplink scheduling grant (UL grant) to be transmitted on a downlink control channel. The UE transmits the A-CSI by using an uplink shared channel indicated by the UL grant according to the trigger included in the downlink control information for the UL grant. Furthermore, when CA is applied, the user terminal can receive a UL grant (including an A-CSI trigger) for a certain cell from a downlink control channel of another cell.

Furthermore, the UE can also measure a channel state by using a CRS transmitted in each subframe. In this case, the UE reports a measurement result (CSI) to the radio base station at a given timing.

By the way, it has been studied for a future radio communication system (also referred to as 5G/NR) to make a CSI reporting according to a configuration different from those of the legacy LTE systems. For example, it has been studied to make a CSI reporting by using multiple CSI types whose information types and/or sizes to be reported are different. The information type to be reported by the CSI may be referred to as a CSI parameter, a CSI feedback parameter or CSI information.

A plurality of CSI types may be configured according to usage applications (or a communication function). For example, a CSI type (also referred to as type 1 CSI) configured to perform communication by using a single beam, and a CSI type (also referred to as type 2 CSI) configured to perform communication by using multiple beams may be defined. Naturally, the usage applications of the CSI types are not limited to this.

The UE and the base station may use the type 1-CSI to maintain a coarse link that uses the single beam. Furthermore, the UE and the base station may use the type 2-CSI to establish a link that uses the multiple beams (e.g., a plurality of layers). For example, the type 2-CSI may be configured to include information (or beam related information such as a beam number) per layer.

Furthermore, the UE and the base station may perform control to report only part of CSI parameters of the information types (CSI parameters) of the type 2-CSI. CSI including part of the information types may be referred to as partial type 2-CSI.

When transmitting the type 1-CSI by using an uplink control channel, the UE reports, for example, an RI and/or a CSI-RS Resource Indicator (CRI), a PMI and a CQI as CSI parameters. In addition, as the PMI, a PMI 1 of a wideband and a long feedback duration, and a PMI 2 of a subband and a short feedback duration may be included. In addition, the PMI 1 is used to select a vector W1, the PMI 2 is used to select a vector W2, and a precoder W is determined based on W1 and W2 (W=W1*W2).

Furthermore, when transmitting the partial type 2-CSI by using an uplink control channel, the UE reports, for example, the RI, the CQI and a number of non-zero wideband amplitude coefficients per layer as the CSI parameters. The number of non-zero wideband amplitude coefficients corresponds to a beam number whose amplitude is not scaled to zero. In this case, information of a beam whose amplitude is zero (or is equal to or less than a given threshold that can be regarded as substantially zero or is less than the threshold). Consequently, by transmitting the number of non-zero wideband amplitude coefficients, it is possible to reduce a PMI overhead.

Furthermore, it has been studied for the future radio communication system to define multiple CSI reporting periodicities (or reporting timings), and associate each reporting periodicity with at least one of a frequency granularity to be reported, a physical channel used for a CSI reporting and a codebook (or a CSI type) (see FIG. 1).

When, for example, a CSI reporting is periodically made (P-CSI: Periodic CSI), a wideband and/or a partial band are used as the frequency granularities, a short PUCCH and/or a long PUCCH are used as the physical channels, and the type 1-CSI is used as the codebook. When the CSI reporting is periodically made, at least one of the reporting periodicity, a PUCCH resource to be used, and the CSI type is configured to the UE by using a higher layer signaling (e.g., RRC signaling).

Furthermore, when the CSI reporting is semi-persistently made (SP-CSI: Semi-Persistent CSI), at least one of the wideband, the partial band and a subband is used as the frequency granularity, a long PUCCH and/or a PUSCH are used as the physical channels, and the type 1-CSI and/or the partial type 2-CSI are used as the codebooks. The partial type 2-CSI may be configured to be transmitted on the long PUCCH. When the CSI reporting is semi-persistently made, for example, the partial type 2-CSI can be configured to the UE by using MAC control information (MAC CE). In addition, downlink control information may be used in addition to the MAC CE.

Furthermore, when the CSI reporting is aperiodically made (A-CSI: Aperiodic CSI), at least one of the wideband, the partial band and the subband is used as the frequency granularity, the PUSCH and/or the short PUCCH are used as the physical channels, and the type 1-CSI and/or the type 2-CSI are used as the codebooks. When the CSI reporting is aperiodically made, the type 1-CSI and/or the type 2-CSI can be configured to the UE by using the downlink control information.

The short PUCCH corresponds to a UL control channel of a shorter duration than those of PUCCH formats of the legacy LTE systems (e.g., LTE Rel. 8 to 13). Furthermore, the long PUCCH corresponds to a UL control channel of a longer duration than the shorter duration of the short PUCCH.

The short PUCCH includes a given number of symbols (e.g., 1, 2 or 3 symbols) at a given Sub-Carrier Spacing (SCS). On the short PUCCH, uplink control information and a reference signal may be subjected to Time Division Multiplexing (TDM) or may be subjected to Frequency Division Multiplexing (FDM). The RS may be, for example, a DeModulation Reference Signal (DMRS) used to demodulate the UCI.

The SCS of each symbol of the short PUCCH may be identical to or higher than the SCS of a symbol for a data channel (also referred to as a data symbol below). The data channel may be, for example, a downlink data channel or an uplink data channel. The short PUCCH may be configured to a domain including at least a last symbol of each slot.

On the other hand, the long PUCCH is arranged over a plurality of symbols in a slot to improve a coverage compared to the short PUCCH and/or convey more UCI. For example, the long PUCCH may be configured by using 7 symbols or 14 symbols.

On the long PUCCH, the UCI and the RS (e.g., DMRS) may be subjected to TDM, or may be subjected to FDM. Frequency hopping may be applied to the long PUCCH per given duration (e.g., mini (sub) slot) in the slot. When intra-slot frequency hopping is applied, a DMRS of 1 or 2 symbols is preferably mapped per hop.

The long PUCCH may include frequency resources the number of which is equal to that of the short PUCCH, or may include frequency resources (one or two Physical Resource Blocks (PRBs)) the number of which is smaller than that of the short PUCCH to obtain a power amplification effect. Furthermore, the long PUCCH may be arranged in a slot identical to that of the short PUCCH.

Thus, it is also considered for the future radio communication system to configure CSI reportings that use a plurality of CSI types at respectively different reporting periodicities. In this case, there is a risk that, depending, for example, the reporting periodicity (or the transmission timings) configured by the base station, transmission timings overlap (collision occurs) between the P-CSI, the SP-CSI and the A-CSI and/or between a plurality of CSI types.

FIG. 2 illustrates one example of a case where transmission timings of the type 1-CSI that uses the short PUCCH and/or the long PUCCH, and the type 2-CSI that uses the long PUCCH collide at a given timing. In this regard, FIG. 2 illustrates a case where frequency hopping is applied to the long PUCCH, yet the present invention is not limited to this.

More specifically, FIG. 2 illustrates a case where, when the type 1 CSI (type 1 P-CSI) to be periodically configured, and the partial type 2 CSI (type 2 SP-CSI) to be semi-persistently configured each use a PUCCH (e.g., long PUCCH), transmission overlaps in a given slot.

Thus, when transmission timings of different CSI types (the type 1-CSI and the partial type 2-CSI in this case) collide, a problem is how the UE needs to control a CSI reporting.

Hence, the inventors of this application have conceived controlling a CSI reporting based on a given rule when transmission timings overlap between multiple CSI in a configuration where multiple CSI (or CSI types) are each transmitted based on a timing configured by the base station. When, for example, transmission timings of first CSI (e.g., type 1 CSI) and second CSI (e.g., type 2 CSI) overlap, control is performed to transmit both or one of the type 1 CSI and/or the type 2 CSI.

In one example, CSI parameters of a given CSI type are compressed, puncturing is performed, a transmission method is changed per CSI type, given CSI parameters are restricted, resources and/or a format used for CSI transmission are changed, the given CSI type and/or the CSI parameters are dropped, or a CSI transmission timing is changed.

An embodiment according to the present invention will be described in detail below with reference to the drawings. A configuration described in each aspect may be each applied alone or may be applied in combination. In this regard, following aspects (first to eighth aspects) will describe a case where the SP-CSI that uses the long PUCCH and/or the PUSCH, and the P-CSI that uses the long PUCCH and/or the short PUCCH collide (a case where the type 2-SP-CSI that uses the long PUCCH and the type 1-P-CSI that uses the long PUCCH and/or the short PUCCH collide in particular) as an example. In addition, cases to which the present embodiment is applicable are not limited to these. As the type 2-CSI, the partial type 2-CSI may be applied or CSI of other types may be applied.

Furthermore, signals to which the present embodiment is applicable are not limited to Channel State Information (CSI). The present embodiment may be applied likewise to signals for which different transmission periodicities (or transmission timings) and/or different signal types are defined.

(First Aspect)

According to the first aspect, when transmission timings of a first CSI type (e.g., type 1-CSI) and a second CSI type (e.g., type 2-CSI) overlap, information included in at least one of the type 1-CSI and the type 2-CSI is compressed to control a CSI reporting.

For example, given CSI parameters included in the type 1-CSI and/or the type 2-CSI are compressed. Compression of the CSI parameters refers to an operation of reducing an information amount of the CSI parameters. For example, granularities of the CSI parameters are increased. In one example, SubBand CSI parameters (SB CSI parameters) are replaced with (changed to) the WideBand CSI parameters (WB CSI parameters).

When, for example, the type 1-CSI and the type 2-CSI collide, the subband CSI parameters are replaced with the wideband CSI parameters in the type 1-CSI. In this case, the UE includes in the type 1-CSI a PMI and a CQI associated the wideband instead of a PMI and a CQI associated with the subband, and makes the CSI reporting. On the other hand, the UE includes in the type 2-CSI the CQI associated with the subband, and makes the CSI reporting.

By replacing the subband CSI parameters with the wideband CSI parameters in the type 1-CSI, it is possible to perform control such that an overhead does not exceed a given value (e.g., 75 bits). Consequently, even when the transmission timings of the type 1-CSI and the type 2-CSI overlap, it is possible to make both of the CSI reportings on a PUCCH without dropping one of the type 1-CSI and the type 2-CSI.

Alternatively, when the type 1-CSI and the type 2-CSI collide, the UE replaces the subband CSI parameters with the wideband CSI parameters in the type 2-CSI. In this case, the UE includes in the type 2-CSI the CQI associated with the wideband instead of the CQI associated with the subband, and makes the CSI reporting. On the other hand, the UE includes in the type 1-CSI the CQI and the PMI associated with the subband, and makes the CSI reporting.

By replacing the subband CSI parameters with the wideband CSI parameters in the type 2-CSI, it is possible to perform control such that an overhead does not exceed a given value (e.g., 110 bits). Consequently, even when the transmission timings of the type 1-CSI and the type 2-CSI overlap, it is possible to make both of the CSI reportings on the PUCCH without dropping one of the type 1-CSI and the type 2-CSI.

Figure 3:
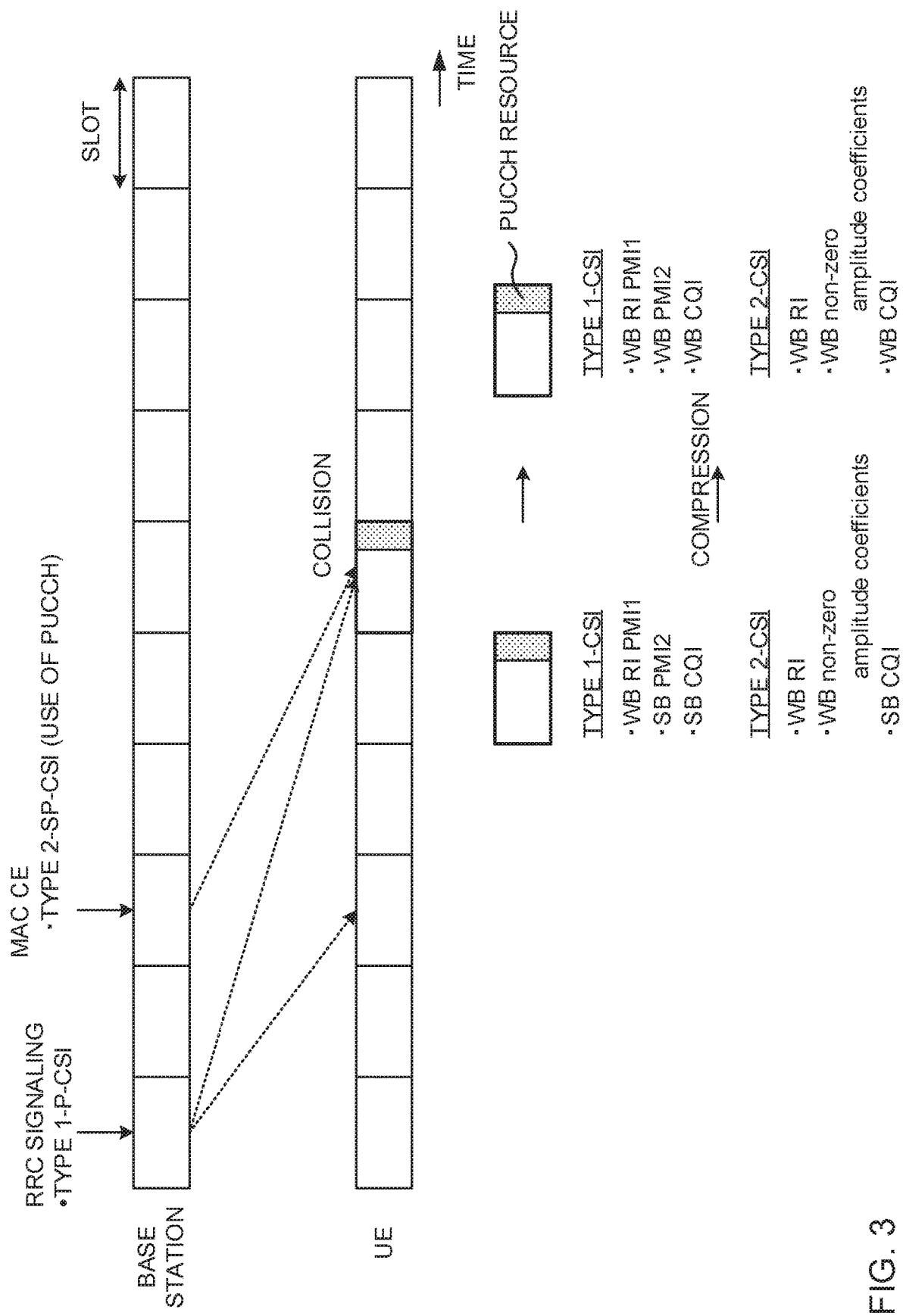
FIG. 3 is a diagram illustrating one example of a case where CSI parameters of pieces of CSI whose transmission timings collide are compressed.

Alternatively, the subband CSI parameters and the wideband CSI parameters may be replaced in both of the type 1-CSI and the type 2-CSI (see FIG. 3). For example, the UE includes only information of the wideband in the type 1-CSI and the type 2-CSI, and makes the CSI reporting. In this case, the UE includes in the type 1-CSI at least one of an RI, the PMI and the CQI associated with the wideband, and includes in the type 2-CSI at least one of the RI, the number of non-zero amplitude coefficients and the CQI associated with the wideband to transmit.

When the type 1-CSI and the type 2-CSI collide, if the type 1-CSI is dropped, only the CSI parameters included in the type 2-CSI are reported to the base station. Therefore, the CSI parameters obtained on the base station become insufficient. Furthermore, if the type 2-CSI is dropped, a configured object (function) of the type 2-CSI cannot be sufficiently achieved. On the other hand, by compressing information to be included in at least one CSI when the type 1-CSI and the type 2-CSI collide, it is possible to make both of the CSI reportings by using the PUCCH. As a result, it is possible to report pieces of CSI of different functions to the base station, so that the base station side can learn a channel state of the UE configured for each use, and control communication. Consequently, it is possible to improve communication quality.

(Second Aspect)

According to the second aspect, when transmission timings of a type 1-CSI and a type 2-CSI overlap, information included in at least one of the type 1-CSI and the type 2-CSI is deleted (punctured) to control a CSI reporting.

When, for example, the type 1-CSI and the type 2-CSI collide, the UE reduces information amounts related to a frequency-domain for CSI parameters related to a subband in the type 1-CSI and/or the type 2-CSI. In one example, when the type 1-CSI and the type 2-CSI collide, the UE subsamples a PMI and/or a CQI of the type 1-CSI in the frequency domain, and makes the CSI reporting (see FIG. 4).

Figure 4:
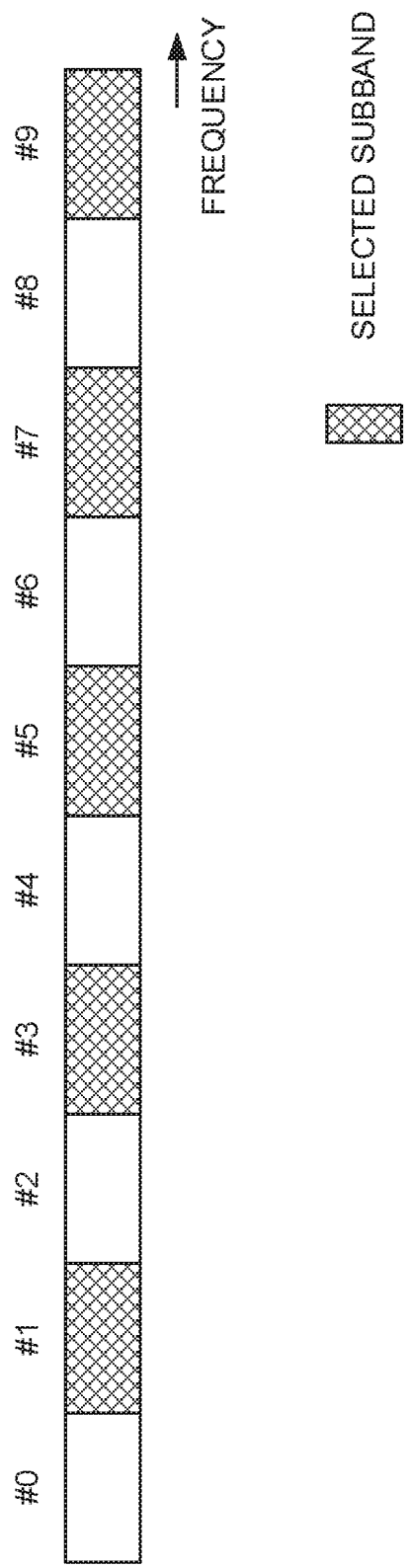
FIG. 4 is a diagram illustrating one example of a method for selecting a subband reported by CSI.

In FIG. 4, part of subbands (SBs #1, #3, #5, #7 and #9 that are odd numbers in this case) are selected from a plurality of subbands (SBs #0 to #9 in this case). Furthermore, the UE includes, in the type 1-CSI, PMIs and/or CQIs associated with the selected subbands, and makes the CSI reporting. That is, the SBs #0, #2, #4, #6 and #8 are not included in the CSI. In addition, CSI parameters to be sub sampled may be both of the PMI and the CQI or may be one of the PMI and the CQI.

By subsampling the CSI parameters of the subbands in the type 1-CSI, it is possible to reduce an overhead of the type 1-CSI. Consequently, even when the transmission timings of the type 1-CSI and the type 2-CSI overlap, it is possible to make both of CSI reportings without dropping one of the type 1-CSI and the type 2-CSI.

Alternatively, when the type 1-CSI and the type 2-CSI collide, the UE may subsample the CQI of the type 2-CSI in a frequency domain, and make the CSI reporting.

Alternatively, when the type 1-CSI and the type 2-CSI collide, the UE may subsample the subband CSI parameters of the type 1-CSI and the type 2-CSI in the frequency domain, and make the CSI reporting. In this case, the same subsample rule may be applied to the type 1-CSI and the type 2-CSI, or different subsample rules may be applied thereto.

When the same subsample rule is applied to the type 1-CSI and the type 2-CSI, for example, the same resource (e.g., resource block) is punctured in the type 1-CSI and the type 2-CSI. For example, control is performed to puncture the same PRB of a plurality of subbands (e.g., PRBs) in the type 1-CSI and the type 2-CSI.

Figure 5:
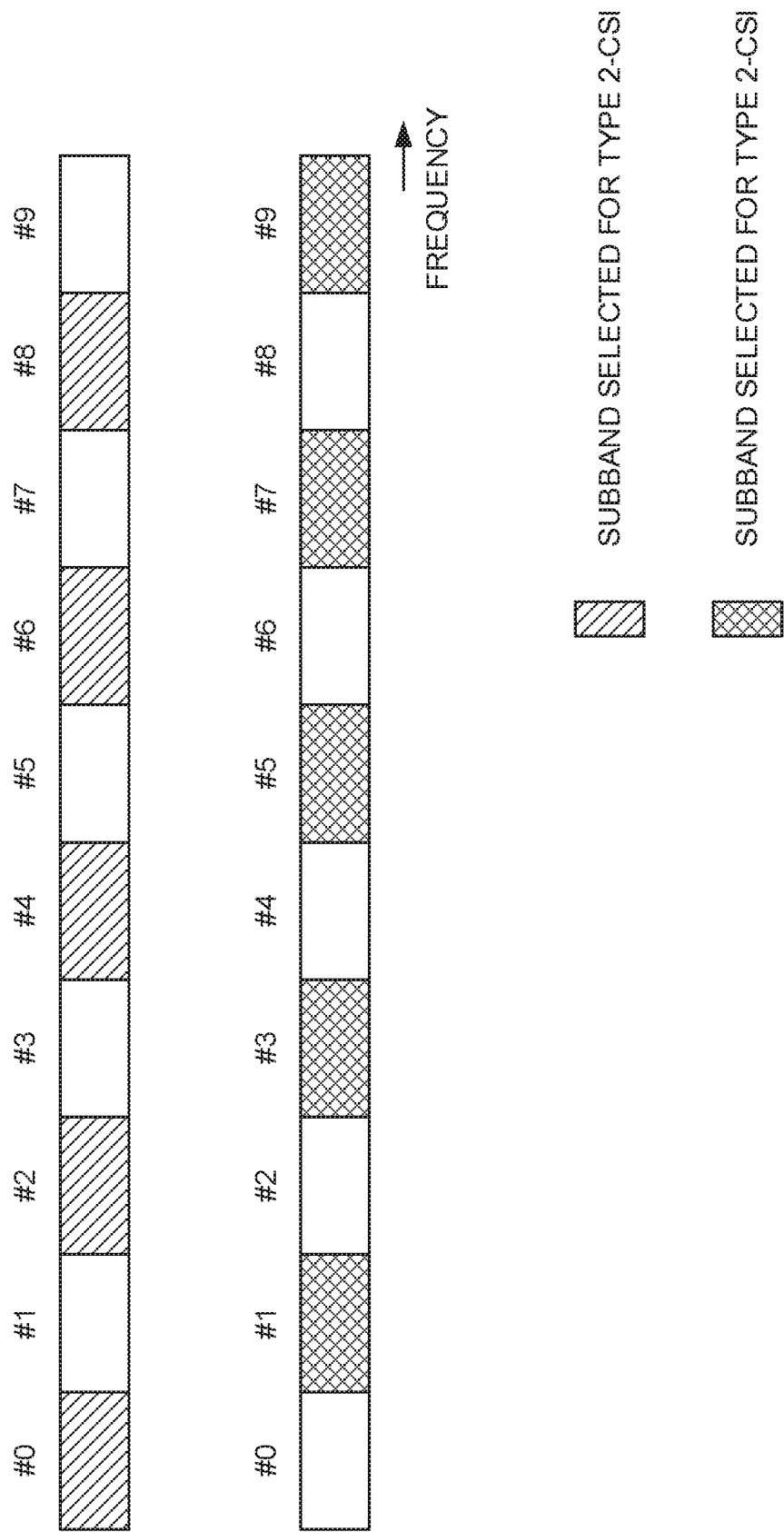
FIG. 5 is a diagram illustrating another example of the method for selecting a subband reported by CSI.

Alternatively, when the different subsample rules are applied to the type 1-CSI and the type 2-CSI, different resources (e.g., resource blocks) are punctured in the type 1-CSI and the type 2-CSI. For example, control is performed to puncture different PRBs (e.g., even-numbered PRBs in a case of the type 1-CSI and odd-numbered PRBs in a case of the type 2-CSI) of a plurality of subbands (e.g., PRBs) in the type 1-CSI and the type 2-CSI (see FIG. 5).

Thus, by puncturing information included in at least one CSI when the type 1-CSI and the type 2-CSI collide, it is possible to make both of the CSI reportings by using the same PUCCH resources. As a result, it is possible to report pieces of CSI of different functions to a base station, so that the base station side can learn a channel state of the UE configured for each use, and control communication. Consequently, it is possible to improve communication quality.

(Third Aspect)

According to the third aspect, when transmission timings of a type 1-CSI and a type 2-CSI overlap, CSI parameters of the type 1-CSI and the type 2-CSI are transmitted in different formats (methods).

For example, the CSI parameters (e.g., CQIs and/or RIs) that are common between the type 1-CSI and the type 2-CSI are transmitted by different methods. The different methods may include changing payloads (the numbers of bits) of the CSI parameters.

When use of the same CSI calculation for the type 1-CSI and type 2-CSI reportings is assumed, the number of bits used to report the CQI and/or the RI of one CSI type is made smaller than the number of bits used to report the other CSI type.

Figure 6:
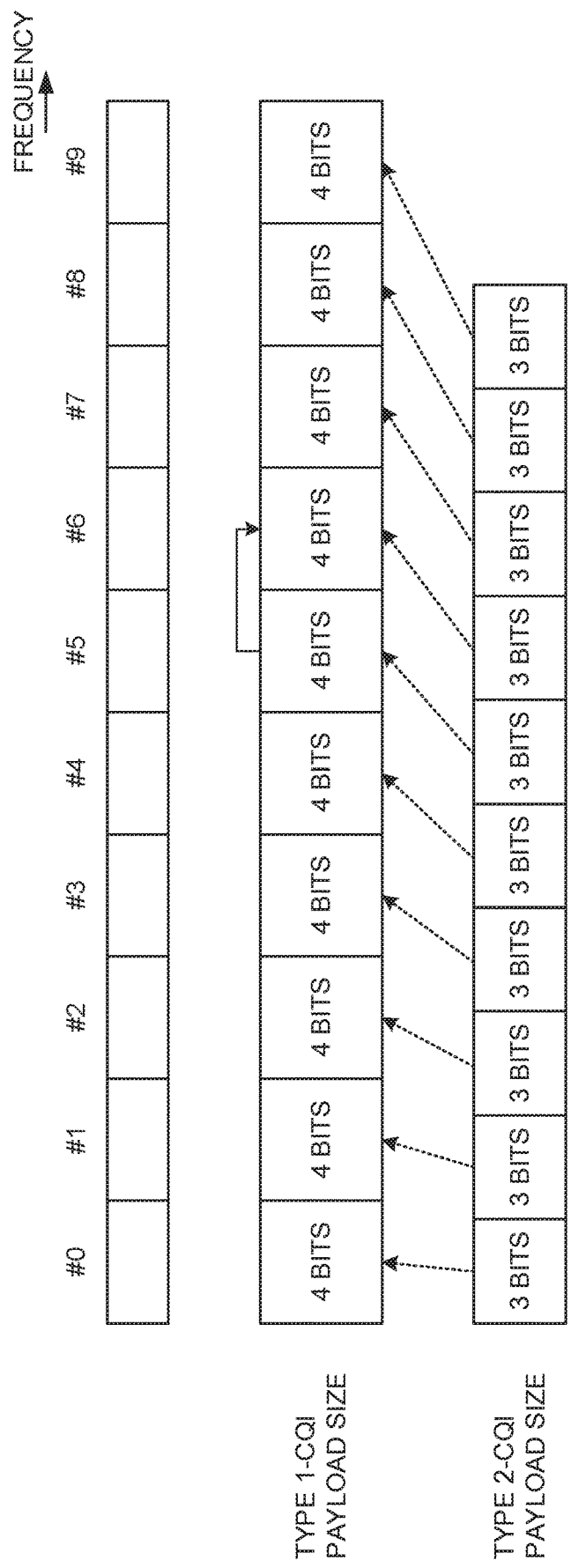
FIG. 6 is a diagram illustrating one example of a case where a method for transmitting CSI parameters that are common between pieces of CSI whose transmission timings collide is changed.

For example, although the CQI reporting is made by respectively using 4 bits for each subband (SBs #0 to #9 in this case) in the type 1-CSI, the CQI reporting is made by respectively using 3 bits or less (e.g., 1, 2, or 3 bits) for each subband (the SBs #0 to #9 in this case) in the type 1-CSI (see FIG. 6). That is, a granularity of the CQI reported by the type 2-CSI becomes coarse compared to the type 1-CSI.

In this regard, the number of bits of the CQI and/or the RI in each subband of the type 1-CSI may be made smaller than the number of bits of the CQI and/or the RI in each subband of the type 2-CSI.

According to the third aspect, although the granularities of the CSI parameters (e.g., the CQI and/or the RI) of one CSI type become coarse compared to the other CSI type, it is possible to reduce a total information amount of the type 1-CSI and the type 2-CSI. Consequently, even when the transmission timings of the type 1-CSI and the type 2-CSI overlap, it is possible to make both of the CSI reportings without dropping one of the type 1-CSI and the type 2-CSI.

(Fourth Aspect)

According to the fourth aspect, when transmission timings of a type 1-CSI and a type 2-CSI overlap, ranks (or the numbers of layers) to be reported by the type 1-CSI and/or the type 2-CSI are restricted.

When, for example, the transmission timings of the type 1-CSI and the type 2-CSI overlap, control is performed to report information related to the ranks equal to or less than a given value during reporting of the type 1-CSI and the type 2-CSI. The numbers of ranks to be reported may be configured to the same or may be configured differently between the type 1-CSI and the type 2-CSI.

In one example, the UE reports an RI, a PMI and a CQI of a rank 1 by using the type 1-CSI, and reports the RI, the number of non-zero amplitude coefficients and the CQI of the rank 1 by using the type 2-CSI.

Alternatively, the UE may respectively report CSI parameters of different ranks (layers) by respectively using the type 1-CSI and the type 2-CSI. For example, the UE reports the CSI parameters associated with ranks 1 to 2 by using the type 2-CSI, and reports the CSI parameters associated with other ranks 3 to 8 by using the type 1-CSI.

Thus, by reporting CSI parameters associated with respectively different ranks by the type 1-CSI and the type 2-CSI, a base station side can obtain the CSI parameters associated with each rank (each layer).

Furthermore, by restricting the ranks to be reported by the type 1-CSI and/or the type 2-CSI, it is possible to reduce a total payload size of the type 1-CSI and the type 2-CSI. Consequently, even when the transmission timings of the type 1-CSI and the type 2-CSI overlap, it is possible to make both of CSI reportings by using a PUCCH without dropping of the type 1-CSI and the type 2-CSI.

(Fifth Aspect)

According to the fifth aspect, when transmission timings of a type 1-CSI and a type 2-CSI overlap, PMI types to be reported by the type 1-CSI are reduced to reduce an overhead. That is, codebook subsampling is applied to reporting of the PMIs of the type 1-CSI.

For example, a case where 16 beams (beam indices #0 to #15) in total are applied to DL transmission is assumed (see FIG. 7). When the codebook subsampling is applied, part of the beam indices are excluded from a plurality of beams to configure the beam indices. In this regard, this case indicates that the rest of beam indices (#0, #2, #4, #6, #8, #10, #12 and #14) except beam indices of odd numbers among the beam indices #0 to #15 are used for a CSI reporting.

A UE selects a given beam index from the eight beam indices #0, #2, #4, #6, #8, #10, #12 and #14, and includes the given beam index as the PMI in the type 1-CSI to notify. When, for example, the beam index to be actually fed back is i1 (i1=0 to 7), a base station side may decide that the beam index indicated by 2×i1 is the beam selected by the UE. When selecting and reporting the beam index #4, the UE includes i1=2 in the CSI to notify.

By reducing the number of candidates of beam indices (or PMIs) to be reported by CSI by using codebook subsampling, it is possible to reduce an overhead of the PMI. In a case illustrated in FIG. 7, it is possible to reduce the overhead of the PMI to half.

By reducing the number of beam indices (or PMIs) to be reported by one or both of the type 1-CSI and the type 2-CSI, it is possible to reduce a total payload size of the type 1-CSI and the type 2-CSI. Consequently, even when the transmission timings of the type 1-CSI and the type 2-CSI overlap, it is possible to make both of CSI reportings by using a PUCCH without dropping of the type 1-CSI and the type 2-CSI.

(Sixth Aspect)

According to the sixth aspect, when transmission timings of a type 1-CSI and a type 2-CSI overlap, at least one of the type 1-CSI and the type 2-CSI is dropped.

When, for example, the transmission timings of the type 1-CSI and the type 2-CSI overlap, a UE drops the type 1-CSI and reports only the type 2-CSI. In this case, the UE may drop only part of CSI parameters of the type 1-CSI.

Alternatively, when the transmission timings of the type 1-CSI and the type 2-CSI overlap, the UE drops the type 2-CSI and reports only the type 1-CSI. In this case, the UE may drop only part of CSI parameters of the type 2-CSI.

In addition, a priority may be configured to each CSI type (or CSI parameters), and the UE may be configured to drop a type of a lower priority. The priority may be defined in advance by a specification, or may be notified from a base station to the UE.

Thus, by employing a configuration to drop at least one of the type 1-CSI and the type 2-CSI, it is possible to simplify processing of the UE during a CSI reporting, and suppress an increase in a processing load.

In addition, when the first to seventh aspects are applied, the user terminal may use a given signal to notify the base station of that the user terminal has performed given control on collision of the type 1 and type 2-CSI. For example, two types of DMR sequences used for a PUCCH or a PUSCH may be configured, and different DMRS sequences may be used and transmitted in a case where the given control is performed on the collision of the type 1 and type 2-CSI, and a case where the given control is not performed. In this case, when the user terminal performs one of types of processing described in the first to seventh aspects, the base station can reliably learn that the processing has been performed.

(Seventh Aspect)

According to the seventh aspect, when transmission timings of a type 1-CSI and a type 2-CSI overlap, resources and/or formats of an uplink control channel used for transmission of CSI (or UCI including the CSI) are changed and applied to control a CSI reporting.

For example, pluralities of PUCCH resources and/or PUCCH formats are configured to a UE in advance. For example, a base station only needs to configure the pluralities of PUCCH resources and/or PUCCH formats to the UE by using a higher layer signaling and/or a physical layer signaling. The UE selects a given PUCCH resource and/or PUCCH format according to, for example, the number of CSI types to be transmitted concurrently (e.g., in the same slot), and a payload size (or the number of bits), and makes a CSI reporting.

Figure 8A:
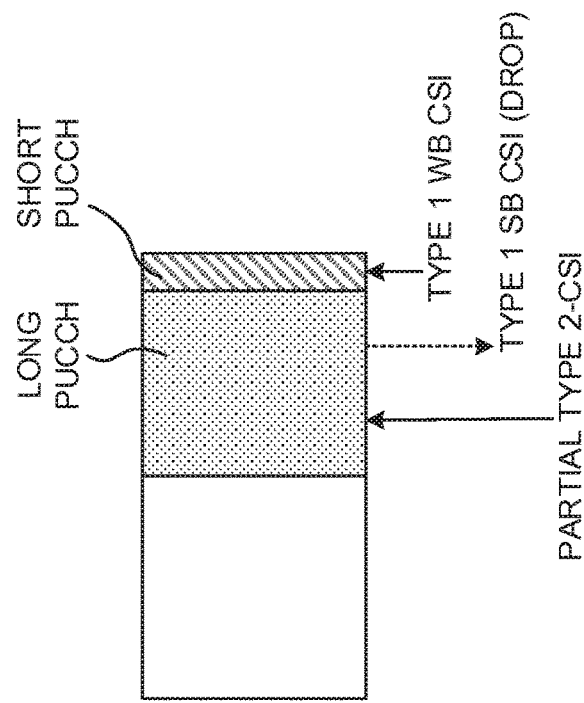
FIGS. 8A and 8B are diagrams illustrating one example of an uplink control channel used for transmission of pieces of CSI whose transmission timings collide.
Figure 8B:
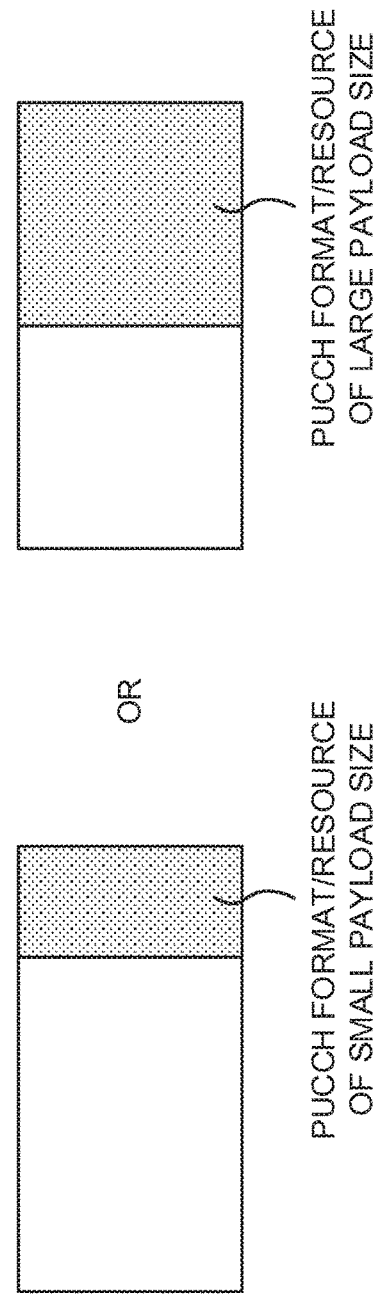

In one example, in a slot in which transmission of one of the type 1-CSI and the type 2-CSI is configured, a PUCCH format of a small payload size is used to make a CSI reporting (see FIG. 8B). In this case, a PUCCH resource to which a small number of PRBs and/or a small number of symbols are configured may be used.

On the other hand, in a slot in which transmission of both of the type 1-CSI and the type 2-CSI is configured, a PUCCH format of a large payload size is used to make a CSI reporting (see FIG. 8B). In this case, a PUCCH resource to which a large number of PRBs and/or a large number of symbols are configured may be used.

By changing the PUCCH resource and/or the PUCCH format according to, for example, the number of CSI types to be transmitted and/or the payload size, it is possible to improve resource use efficiency, and transmit both of CSI types even when the transmission timings of the type 1-CSI and the type 2-CSI overlap.

Furthermore, a plurality of PUCCH resources (or PUCCH formats) may be configured in advance to the type 1-CSI to control CSI parameters to be reported by the type 1-CSI according to whether or not the type 1-CSI collides with the type 2-CSI. For example, a short PUCCH and a long PUCCH are configured for a type 1-CSI reporting (see FIG. 8A). In addition, the short PUCCH is used for wideband CSI parameters of the type 1-CSI, and the long PUCCH is used for subband CSI parameters of the type 1-CSI.

When the transmission timings of the type 1-CSI and the type 2-CSI overlap, the subband CSI parameters of the type 1-CSI that is scheduled to use the long PUCCH are dropped, and the long PUCCH is used for transmission of a partial type 2-CSI instead. In this case, the UE reports CSI parameters of the partial type 2-CSI by using the long PUCCH, and reports the wideband CSI parameters of the type 1-CSI by using the short PUCCH.

(Eighth Aspect)

According to the eighth aspect, when transmission timings of a type 1-CSI and a type 2-CSI overlap, the transmission timing of at least one of the type 1-CSI and the type 2-CSI is changed to control a CSI reporting.

Figure 9:
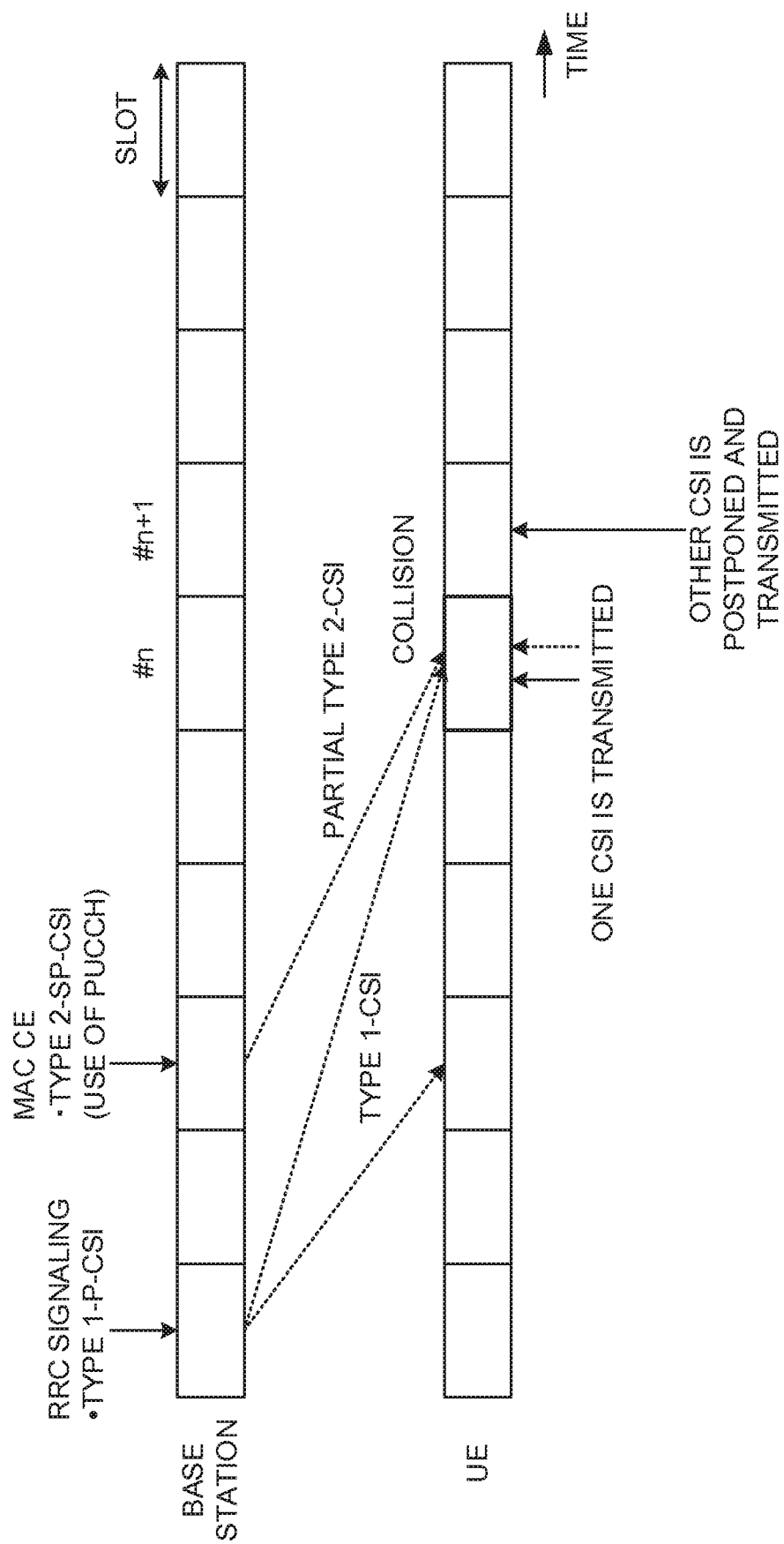
FIG. 9 is a diagram illustrating one example of a case where transmission timings of pieces of CSI whose transmission timings collide are changed.

When the transmission timings of the type 1-CSI and the type 2-CSI collide in a given slot (e.g., a slot #n), a UE postpones the transmission timing of one of the type 1-CSI and the type 2-CSI to a slot after the slot #n to transmit (see FIG. 9). FIG. 9 illustrates a case where one of the type 1-CSI and the type 2-CSI is transmitted in the slot #n, and the other one is changed to a slot #n+1 to control a CSI reporting.

A duration (or a slot after the change) to which the CSI reporting is postponed may be defined in advance by a specification, or may be notified from a base station to the UE. For example, a CSI reporting postponement duration is less than a periodicity of CSI whose transmission timing is postponed from a next slot (slot #n+1). If a transmission timing of CSI whose reporting periodicity is 5 ms is postponed, the postponement duration may be configured to one of 1 ms, 2 ms, 3 ms and 4 ms. Furthermore, a unit of the postponement duration may be a slot unit, or may be a mini slot unit.

Furthermore, priorities may be configured to a plurality of CSI types to postpone and report CSI of a lower priority.

When the transmission timings of the type 1-CSI and the type 2-CSI overlap, it is possible to report both of the CSI types to the base station by changing one transmission timing and controlling the CSI reporting.

(Variation)

<Use of PUSCH>

The above first aspect to eighth aspect have described the cases where, when transmission timings of a type 1-CSI (or a P-CSI) and a type 2-CSI (or an SP-CSI) overlap, a PUCCH is used. However, other UL channels may be used.

When, for example, a PUSCH is configured (UL transmission is instructed by a UL grant) in a slot in which the transmission timings of the type 1-CSI and the type 2-CSI collide, the type 1-CSI (or the P-CSI) and the type 2-CSI (or the SP-CSI) may be multiplexed on the PUSCH and transmitted. Consequently, it is possible to appropriately transmit both of the type 1-CSI and the type 2-CSI.

<Reduction of Long PUCCH>

When the transmission timings of the type 1-CSI (or the P-CSI) to be transmitted on a short PUCCH and the type 2-CSI (or the SP-CSI) to be transmitted on a long PUCCH overlap, the long PUCCH and the short PUCCH may be subjected to time multiplexing, and both pieces of the CSI may be transmitted.

In this case, the long PUCCH may be reduced in a time direction (the number of symbols of the long PUCCH may be reduced), and may be subjected to time multiplexing with the short PUCCH. By using a reduced format of the long PUCCH in this way, it is possible to appropriately transmit both of the type 1-CSI and the type 2-CSI by using the PUCCH.

(CSI Collision Case)

The above description has described the case where, when the SP-CSI that uses the long PUCCH and/or the PUCCH, and the P-CSI that uses the long PUCCH and/or the short PUCCH collide, (the case where the type 2 SP-CSI that uses the long PUCCH and the type 1 P-CSI that uses the long PUCCH and/or the short PUCCH collide in particular) as an example. However, cases to which the present embodiment is applicable are not limited to this. The present embodiment may be applied to following cases of collision of multiple CSI types.

<Case 1>

When the P-CSI that uses the long PUCCH and A-CSI that uses the short PUCCH and/or the PUSCH collide, one of following options 1-1 to 1-3 is taken.

When the A-CSI is transmitted on the PUSCH, the P-CSI is multiplexed on the PUSCH for transmitting the A-CSI (option 1-1).

When the A-CSI is transmitted on the short PUCCH, the long PUCCH for the P-CSI is reduced, and the short PUCCH and the long PUCCH are subjected to time multiplexing to control a CSI reporting (option 1-2).

The P-CSI is dropped, and only the A-CSI is transmitted (option 1-3).

<Case 2>

When the SP-CSI that uses the long PUCCH and/or the PUSCH, and the A-CSI that uses the short PUCCH and/or the PUSCH collide, one of following options 2-1 to 2-3 is taken.

When the A-CSI is transmitted on the PUSCH, the SP-CSI is multiplexed on the PUSCH for transmitting the A-CSI (option 2-1).

When the A-CSI is transmitted on the short PUCCH, the long PUCCH for the SP-CSI is reduced, and the short PUCCH and the long PUCCH are subjected to time multiplexing to control the CSI reporting (option 2-2).

The SP-CSI is dropped, and only the A-CSI is transmitted (option 2-3).

(Radio Communication System)

The configuration of the radio communication system according to one embodiment of the present invention will be described below. This radio communication system uses one or a combination of the radio communication method according to each of the above embodiment of the present invention to perform communication.

Figure 10:
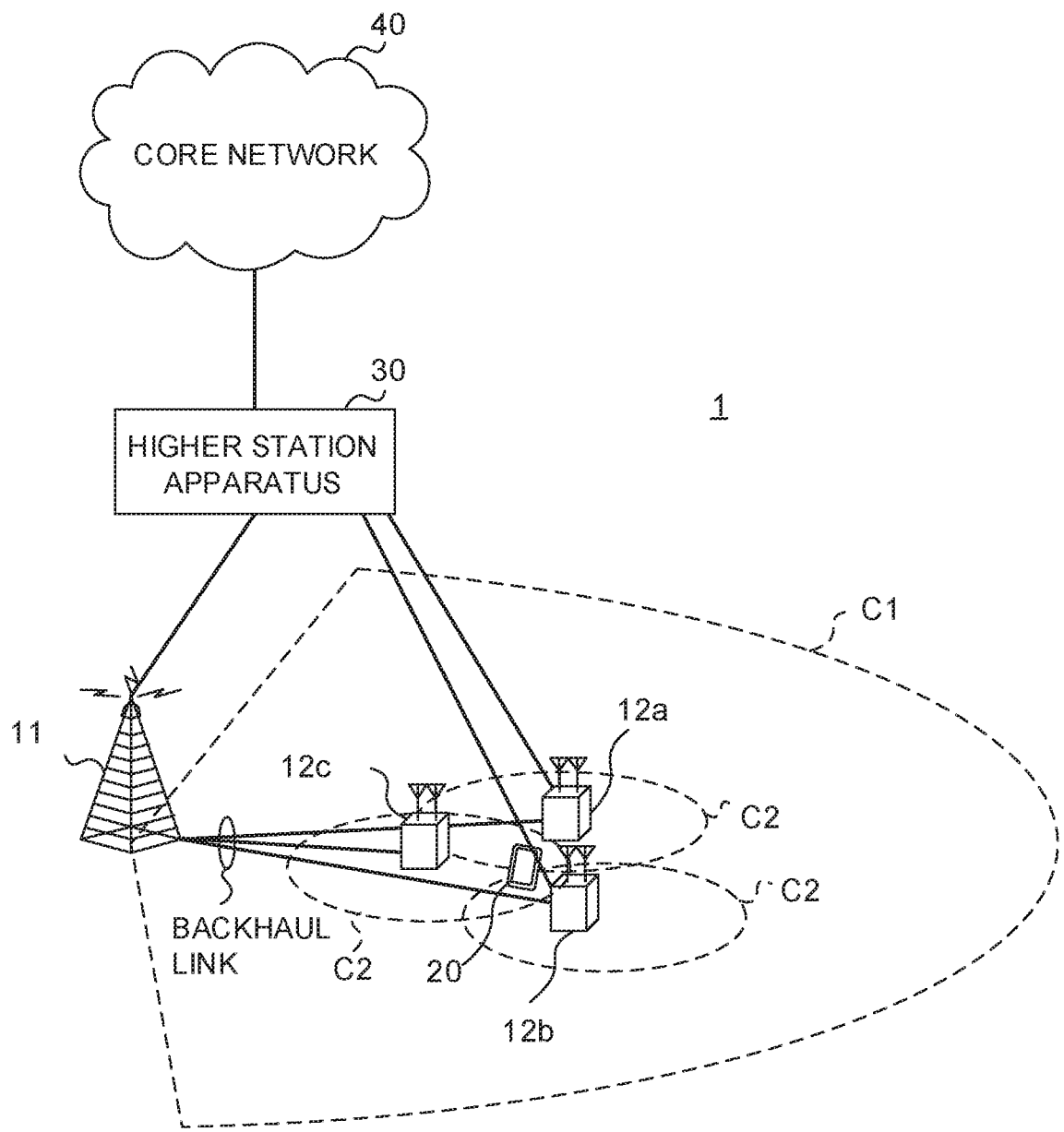
FIG. 10 is a diagram illustrating one example of a schematic configuration of a radio communication system according to one embodiment of the present invention.

FIG. 10 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT) and New Radio (NR), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement of respective cells and the user terminals 20 are not limited to those illustrated in FIG. 10.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) to uplink as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 may be configured to apply different numerologies in a cell and/or between cells. In this regard, the numerologies refer to, for example, communication parameters (e.g., a subcarrier-spacing and a bandwidth) to be applied to transmission and reception of a certain signal.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator) and transmission acknowledgement information are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 11:
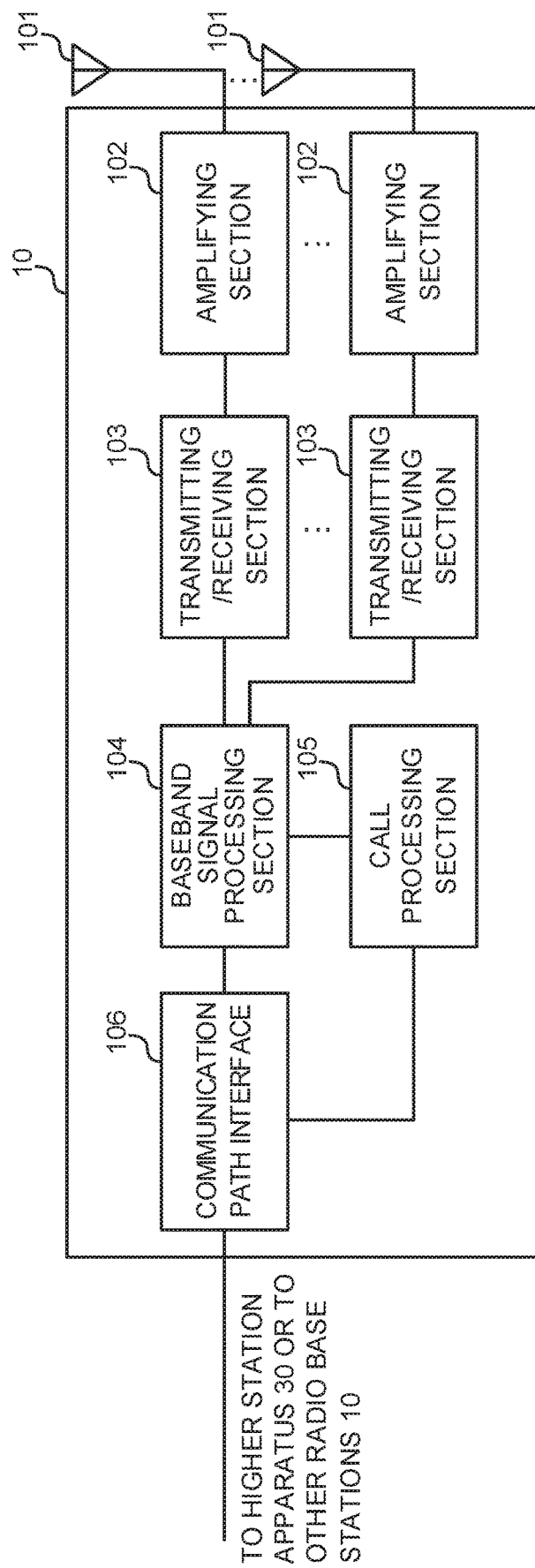
FIG. 11 is a diagram illustrating one example of an overall configuration of a radio base station according to the one embodiment of the present invention.

FIG. 11 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 notifies the UE of CSI reporting configuration information. For example, each transmitting/receiving section 103 transmits to the UE, for example, a CSI reporting periodicity, a CSI type that needs to be reported, and a PUCCH resource and/or a PUCCH format used for a CSI reporting. Furthermore, each transmitting/receiving section 103 receives CSI reported from the UE.

Figure 12:
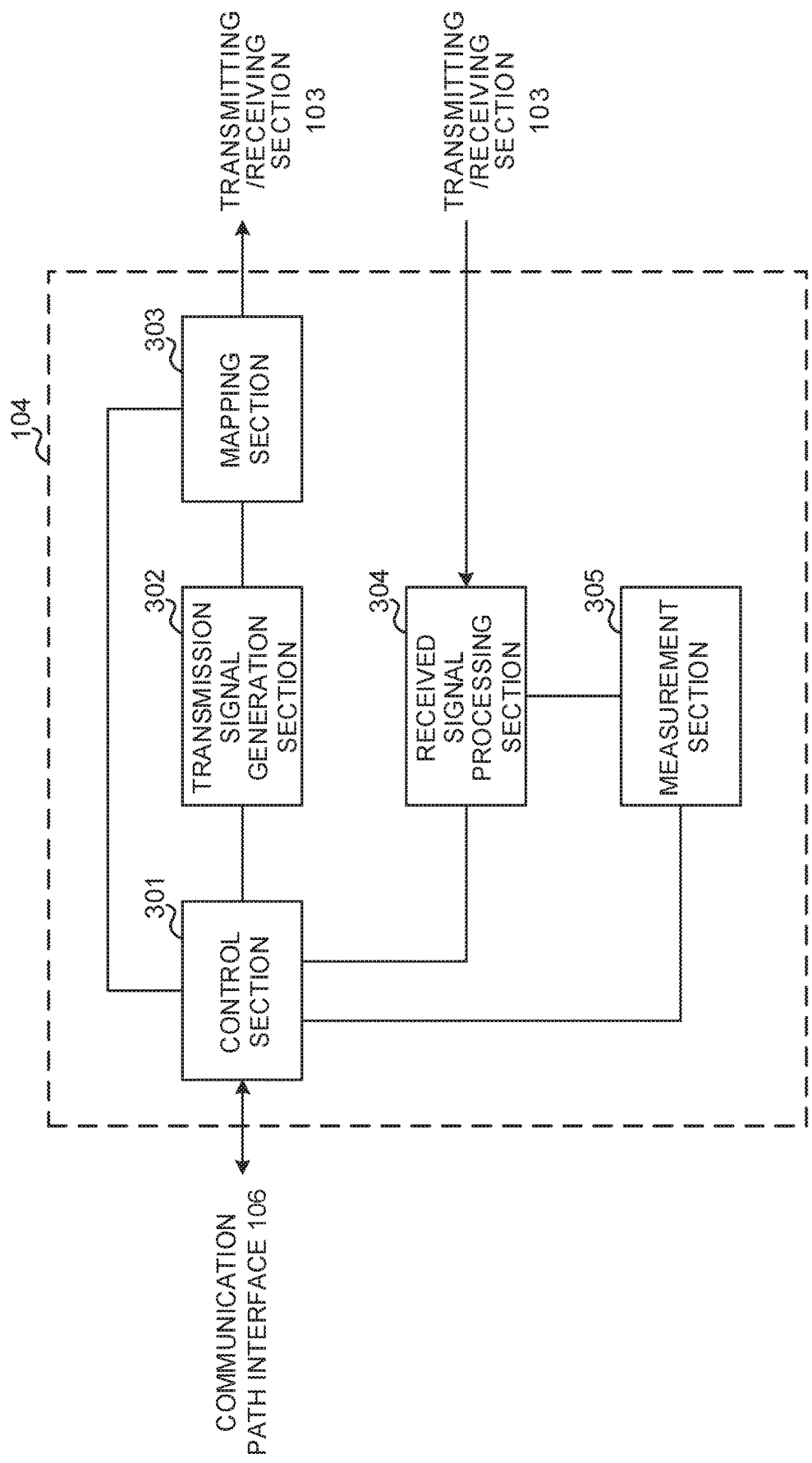
FIG. 12 is a diagram illustrating one example of a function configuration of the radio base station according to the one embodiment of the present invention.

FIG. 12 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH, an EPDCCH or an NR-PDCCH). Furthermore, the control section 301 controls generation of a downlink control signal (e.g., transmission acknowledgement information) and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal that is transmitted on the PUSCH), an uplink control signal (e.g., a signal that is transmitted on the PUCCH and/or the PUSCH), a random access preamble that is transmitted on the PRACH and an uplink reference signal.

The control section 301 configures the CSI reporting configuration information to the UE. For example, the control section 301 performs control to configure to the UE, for example, the CSI reporting periodicity, the CSI type that needs to be reported, and the PUCCH resource and/or the PUCCH format used for the CSI reporting.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on the above given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure received power (e.g., Reference Signal Received Power (RSRP)), received quality (e.g., Reference Signal Received Quality (RSRQ) or a Signal to Interference plus Noise Ratio (SINR)), or uplink channel information (e.g., CSI) of a received signal. The measurement section 305 may output a measurement result to the control section 301.

(User Terminal)

Figure 13:
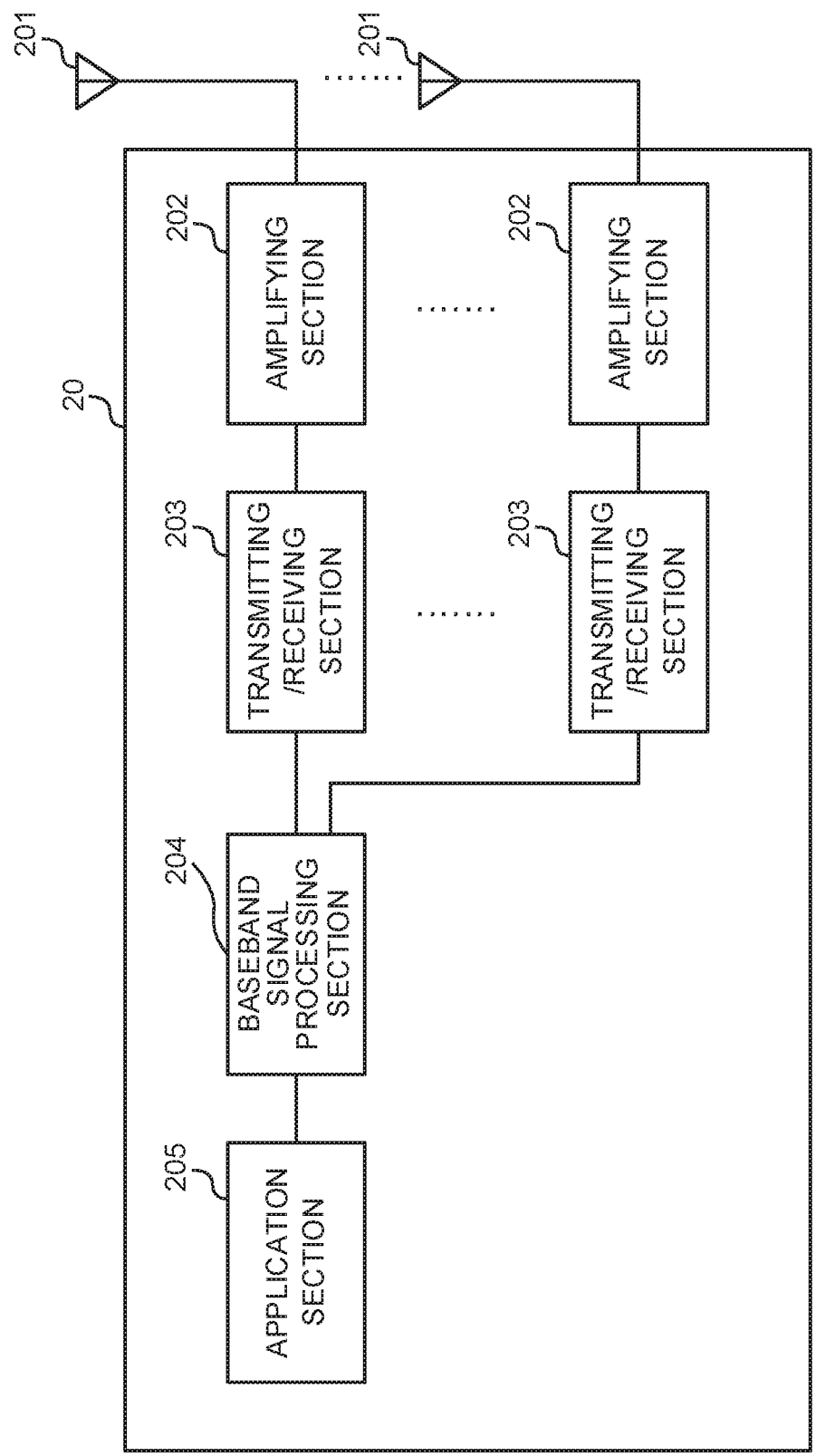
FIG. 13 is a diagram illustrating one example of an overall configuration of a user terminal according to the one embodiment of the present invention.

FIG. 13 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and reception sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 transmits first Channel State Information (CSI) and second CSI of different information types to be reported, based on timings respectively configured by the base station by using an uplink control channel and/or an uplink shared channel. Furthermore, each transmitting/receiving section 203 receives the CSI reporting configuration information. For example, each transmitting/receiving section 203 receives, for example, the CSI reporting periodicity, the CSI type that needs to be reported, and the PUCCH resource and/or the PUCCH format used for the CSI reporting.

Figure 14:
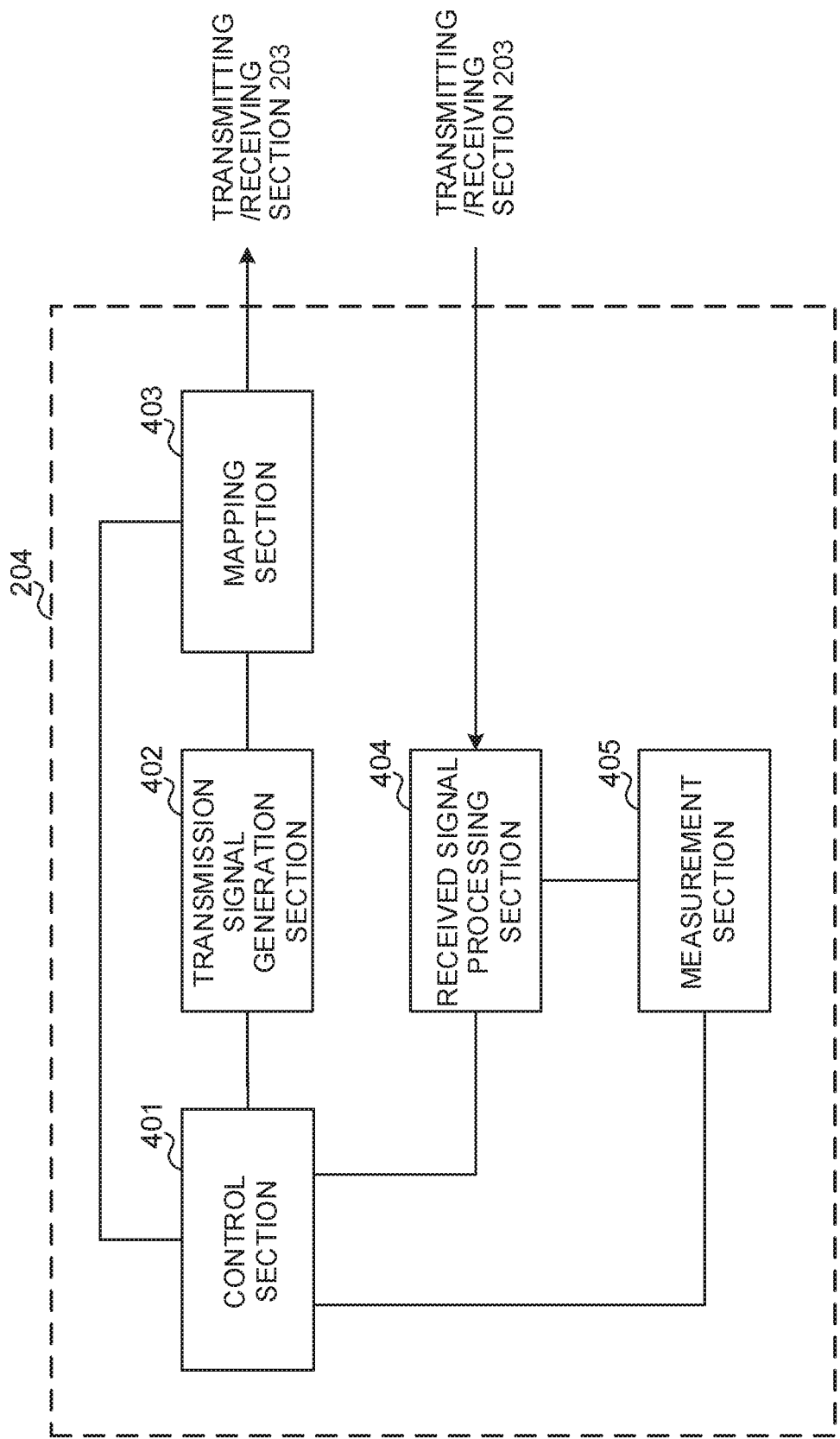
FIG. 14 is a diagram illustrating one example of a function configuration of the user terminal according to the one embodiment of the present invention.

FIG. 14 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal (e.g., a signal that has been transmitted on an NR-PDCCH) and a downlink data signal (a signal that has been transmitted on the PDSCH) that have been transmitted from the radio base station 10. The control section 401 controls generation of an uplink control signal (e.g., transmission acknowledgement information) and/or an uplink data signal based on a result obtained by deciding whether or not it is necessary to perform retransmission control on the downlink control signal and/or the downlink data signal.

When transmission timings of the first CSI and the second CSI overlap, the control section 401 performs control to transmit both or one of the first CSI and the second CSI. For example, the control section 401 performs control to reduce an information amount transmitted by the first CSI and/or the second CSI, and transmit both of the first CSI and the second CSI at the same timing (e.g., same slot).

Furthermore, the control section 401 may perform control to replace subband information with wideband information in the first CSI and/or the second CSI, and/or delete at least part of the subband information.

Furthermore, when the transmission timings of the first CSI and the second CSI overlap, the control section 401 may perform control to change the uplink control channel format and/or the uplink control channel resource, and transmit both of the first CSI and the second CSI.

Furthermore, when the transmission timings of the first CSI and the second CSI overlap, the control section 401 may control to change at least one of the transmission timing of the first CSI and the transmission timing of the second CSI, and transmit both of the first CSI and the second CSI.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. For example, the measurement section 405 performs measurement by using the downlink reference signal transmitted from the radio base station 10. The measurement section 405 can be composed of a measurement instrument, a measurement circuit or a measurement apparatus described based on the common knowledge in the technical field according to the present invention.

The measurement section 405 may measure, for example, received power (e.g., RSRP), received quality (e.g., RSRQ or a received SINR) or downlink channel information (e.g., CSI) of the received signal. The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 15:
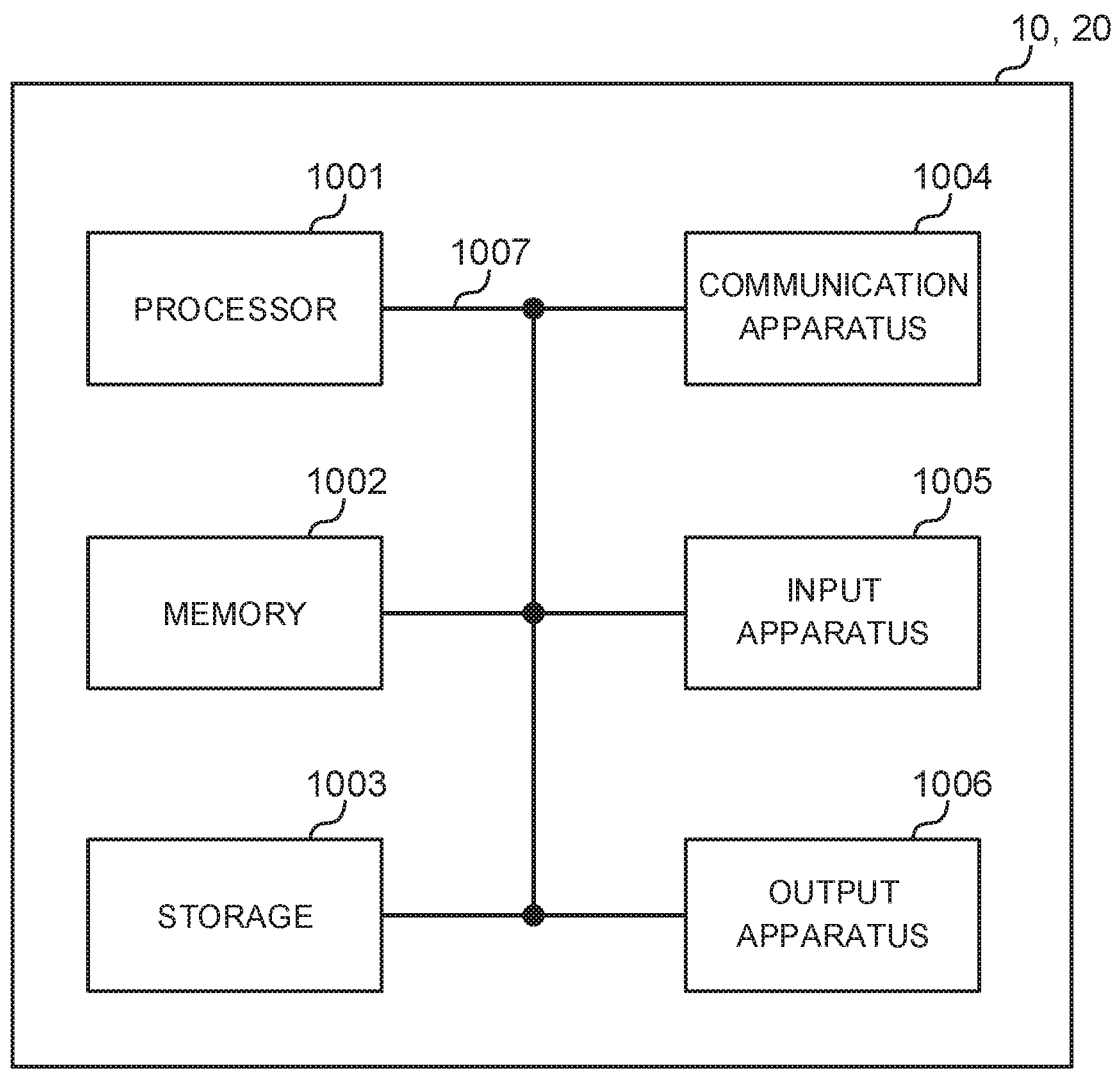
FIG. 15 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 15 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 15 or may be configured without including part of the apparatuses.

For example, FIG. 15 illustrates the only one processor 1001. However, there may be a plurality of processors. Furthermore, processing may be executed by 1 processor or processing may be executed by 1 or more processors concurrently or successively or by another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

(Modified Example)

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to given values or may be expressed by other corresponding information. For example, a radio resource may be instructed by a given index. Furthermore, numerical expressions that use these parameters may be different from those explicitly disclosed in this description.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of given information (e.g., notification of "being X") is not limited to explicit notification, and may be performed implicitly (by, for example, not notifying this given information or by notifying another information). Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access". It can be understood that, when used in this description, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description is intended for exemplary explanation, and does not have any restrictive meaning to the present invention.

The invention claimed is:

1. A terminal comprising:
   a processor that, if transmissions of multiple channel state information (CSI) overlap, determines a resource for an uplink control channel based on a number of bits of the multiple overlapping CSI; and
   a transmitter that transmits at least one of the multiple overlapping CSI by using the uplink control channel,
   wherein the processor selects a specific uplink control channel format among a plurality of uplink control channel formats configured based on the number of bits of the multiple overlapping CSI.

2. The terminal according to claim 1, wherein the multiple overlapping CSI include a type I CSI and a type II CSI of different codebooks.

3. The terminal according to claim 1, wherein the multiple overlapping CSI include periodic CSI and semi-persistent CSI.

4. A radio communication method for a terminal, comprising:
   if transmissions of multiple channel state information (CSI) overlap, determining a resource for an uplink control channel based on a number of bits of the multiple overlapping CSI; and
   transmitting at least one of the multiple overlapping CSI by using the uplink control channel,
   wherein the terminal selects a specific uplink control channel format among a plurality of uplink control channel formats configured based on the number of bits of the multiple overlapping CSI.

5. A system comprising a terminal and base station, wherein:
   the terminal comprises:
      a processor that, if transmissions of multiple channel state information (CSI) overlap, determines a resource for an uplink control channel based on a number of bits of the multiple overlapping CSI; and
      a transmitter that transmits at least one of the multiple overlapping CSI by using the uplink control channel,
   the base station comprises:
      a receiver that receives at least one of the multiple overlapping CSI by using the uplink control channel,
   wherein the processor selects a specific uplink control channel format among a plurality of uplink control channel formats configured based on the number of bits of the multiple overlapping CSI.

* * * * *